(12) United States Patent
Boss et al.

(10) Patent No.: US 8,244,311 B2
(45) Date of Patent: Aug. 14, 2012

(54) TIME-RELATED POWER SYSTEMS

(75) Inventors: Gregory Jensen Boss, Saginaw, MI (US); Srinivas Chidurala, Austin, TX (US); Andrew R. Jones, Round Rock, TX (US); Kevin C. McConnell, Austin, TX (US); Simeon D. Monov, Austin, TX (US); Jose I. Vargas, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 12/648,923

(22) Filed: Dec. 29, 2009

(65) Prior Publication Data
US 2011/0159931 A1 Jun. 30, 2011

(51) Int. Cl.
*H04B 1/04* (2006.01)
(52) U.S. Cl. ........ 455/573; 455/574; 713/300; 713/310; 713/324
(58) Field of Classification Search .................. 455/573, 455/574; 713/300, 310, 320–324, 330, 340
See application file for complete search history.

(56) References Cited

U.S. PATENT DOCUMENTS

| 5,532,935 | A | 7/1996 | Nimoniya | |
|---|---|---|---|---|
| 6,710,578 | B1 * | 3/2004 | Sklovsky | 320/127 |
| 2004/0257463 | A1 | 12/2004 | Goris | |
| 2005/0255893 | A1 | 11/2005 | Jin | |
| 2006/0143483 | A1 * | 6/2006 | Liebenow | 713/300 |
| 2008/0057894 | A1 | 3/2008 | Aleksic | |

OTHER PUBLICATIONS

Damon W. Chu Tradeoffs in Implementing Intelligent Battery Management.
Jawad Khan and Ranga Vemuri An Iterative Algorithm for Battery-Aware Task Scheduling on Portable Computing Platforms.
* cited by examiner

*Primary Examiner* — Patrick Edouard
*Assistant Examiner* — Julio Perez
(74) *Attorney, Agent, or Firm* — David A. Mims, Jr.; Robert V. Wilder

(57) ABSTRACT

A method, programmed medium and system are disclosed which provide for user-controlled management of power requirements for mobile devices. The system dynamically adjusts power settings according to goals set by the end user. The end user specifies a time-to-live goal in hours, minutes or a predetermined date/time and the power management function continuously monitors and adjusts power components to meet that goal.

19 Claims, 3 Drawing Sheets

TIME-RELATED POWER SYSTEMS

FIELD OF THE INVENTION

The present invention relates generally to information processing systems and more particularly to a methodology and implementations for enabling improved power management for mobile devices.

BACKGROUND OF THE INVENTION

Users of wireless devices are becoming more dependent on the functionality provided by mobile devices as the price point drops for all-in-one devices such as phones that include, inter alia, phone, email, text messaging, internet browsing, GPS navigation, GPS tracking and music/picture/video players. Today's workers need to stay connected and reachable. Running out of power for these mobile devices is unacceptable. Users are always scrambling to plug in their devices or having to purchase and carry extra batteries. The ultimate devices are ones that can be trusted to operate for long periods of time and can provide a level of certainty that enough power will be available when needed.

Most of today's mobile devices provide battery level indicators (usually three to five "bars"). However, this does not accurately reflect how long this device will remain operational. Additionally, how long each bar lasts is different depending on whether power consuming components like disks or wi-fi are being utilized. A further complicating factor is that three bars on one device is not the same as three bars on another device.

In some systems, users can select from a list of profiles (optimized, performance, automatic, presentation, etc.). Using one of these profiles users can prolong the life of the battery by dimming the display, turning off the drive, or automatically putting the device on stand-by mode when it is not used within a certain period of time. While this technique is useful for prolonging the battery life in laptop computers, it does not define a goal time for how long the device will continue to run especially smaller battery-operated wireless devices.

Some users also buy extra batteries to ensure they can continue to operate when the current batteries run out. However, there are disadvantages to using this method. Users need to ensure that the second battery is charged when needed. Changing batteries means powering down the device before the second battery can be installed. Lastly there's the cost disadvantage of expensive batteries and challenge of misplacing the them. Others users will carry power adapters with them. However finding an appropriate sitting area close to a power adapter can be difficult, if not impossible. One can easily spot business men looking for outlets to plug their devices at airline terminals. However none of these solutions can effectively provide a method for setting a goal needed to keep the device active.

Thus, there is a need to provide an improved power management processing system which is designed to avoid the problems set forth above.

SUMMARY OF THE INVENTION

A method, programmed medium and system are disclosed which provide for user-controlled management of power requirements for mobile devices. The system dynamically adjusts power settings according to time-related goals set by the end user. The end user specifies a time-to-live (TTL) goal in hours, minutes or a predetermined date/time and the power management function continuously monitors and adjusts power components to meet that goal.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
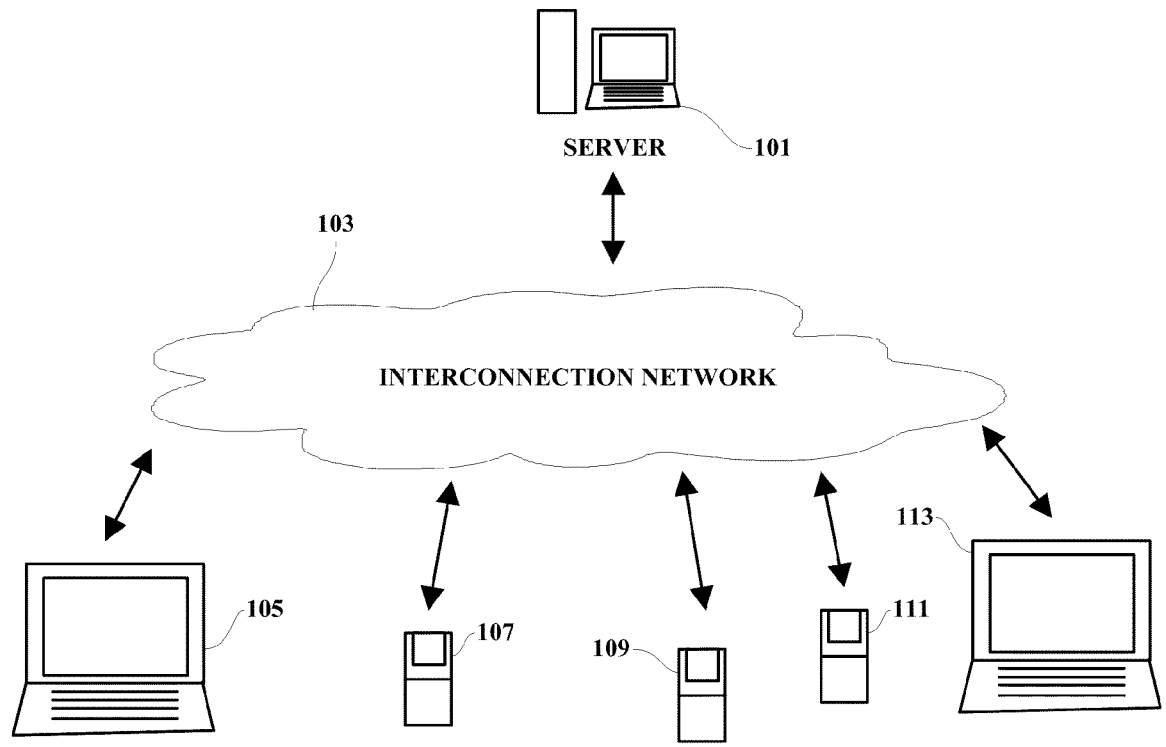
FIG. 1 is an illustration of one embodiment of a system in which the present invention may be implemented.

The various methods discussed herein may be implemented within a computer system which includes processing means, memory, storage means, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a networked computer system using a laptop computer or other portable or wireless device, it is understood that disclosed methodology may also be applied in many other available and future devices and systems such as cell phones and personal wireless and other hand-held devices, including any input device, including touch-sensitive screens or touch-sensitive input pads, to achieve the beneficial functional features described herein.

The disclosed system allows the user to enter a desired "time to live" (TTL) setting which is usually displayed in hours or minutes. The system then dynamically changes power settings and running applications based on that TTL input and constantly re-evaluates the estimated battery life using known methods. After each evaluation the system is enabled to adjust the power to the different components in the computer/device, automatically shut down applications or optionally display a pop up of applications (consuming more power) for the user to select if any of the applications can be closed, automatically shut down applications or optionally display a pop up of least recently used application for the users to select if any of the applications can be closed, and/or automatically shut down or optionally display a pop up of devices (like CD/DVD drives, flash drives, wireless cards, LCD and external monitors, etc . . . ) and let the user prioritize the relative importance of each. The system also enables the user to specify which of the devices and/or applications can be safely turned off if needed.

The system provides for a method to prioritize the execution (mainly stopping of applications) on power sensitive devices (laptops, handhelds, etc) based upon an application's defined importance to a user. Applications use different amounts of power based upon resources they access (CPU, audio, video, radio, storage). As battery power drains the typical response of the OS is to warn the user to plug-in or shutdown. When power goes to a certain threshold the OS may shutdown or hibernate or just close when the power is drained. The disclosed system describes a way for a user to set priorities for applications when battery power reaches various thresholds. For example, if a user has only 20% of battery life remaining, the user may wish all of my priority 4 (lower priority) applications to be closed. These may be games and other applications with relatively little importance. As a 15% power remaining level is reached, a user may want priority 3 applications (relatively higher priority such as web browsers and such) to close. So, on and so on. The advantage is that the high priority applications I define will stay active as long as possible before the device shuts down. These applications and their importance to a user will vary by user, working environment and/or by category of users. This relative importance may be user defined, OS defined, or administrator defined. A user/owner may rank the ability to use a device to make and receive calls as a highest priority process. Further, a user is enabled to define all applications other than phone to exit or close when a 15% remaining battery life is reached. A company deploying devices to field service personnel may define a dispatch application as the highest priority application. In these and other applications, the disclosure enables the user of a wireless device to pro-actively input a time period for which the user needs to maintain battery life, and to further input a user-defined priority listing and application/device shut-down schedule acceptable to the user and automatically accessed and implemented by the system in order to meet the requested TTL.

FIG. 1 illustrates an exemplary environment in which the present invention may be implemented. As shown, a server 101 may be accessed through an interconnection network 103, such as the Internet, by a plurality of wireless battery-operated devices including but not limited to laptop computers 105 and 113 as well as other wireless devices 107, 109 and 111. The devices 107, 109 and 111 may be, for example, personal wireless communication devices.

Figure 2:
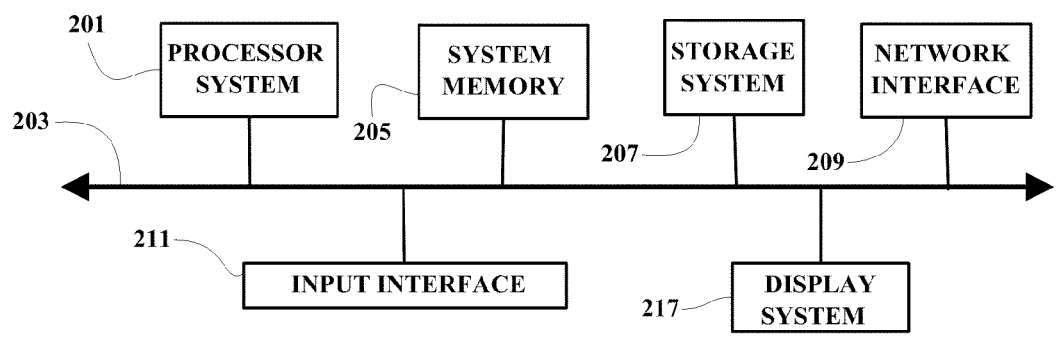
FIG. 2 is a block diagram showing several of the major components of an exemplary computer system or device using the present invention.

FIG. 2 illustrates several of the major components of a computer system which may be used to implement the present invention. As shown, a processor system 201 is connected to a main bus 203. The main bus 203 is also coupled to, inter alia, system memory 205, a local storage system 207, a network interface 209, and an input interface 211. The main bus is also connected to a display system 217. The input and/or display system may also comprise a touch-sensitive screen or optically-sensitive input pad (not shown). Additional devices and bus systems, which are not shown, may also be coupled to the system main bus 203.

Figure 3:
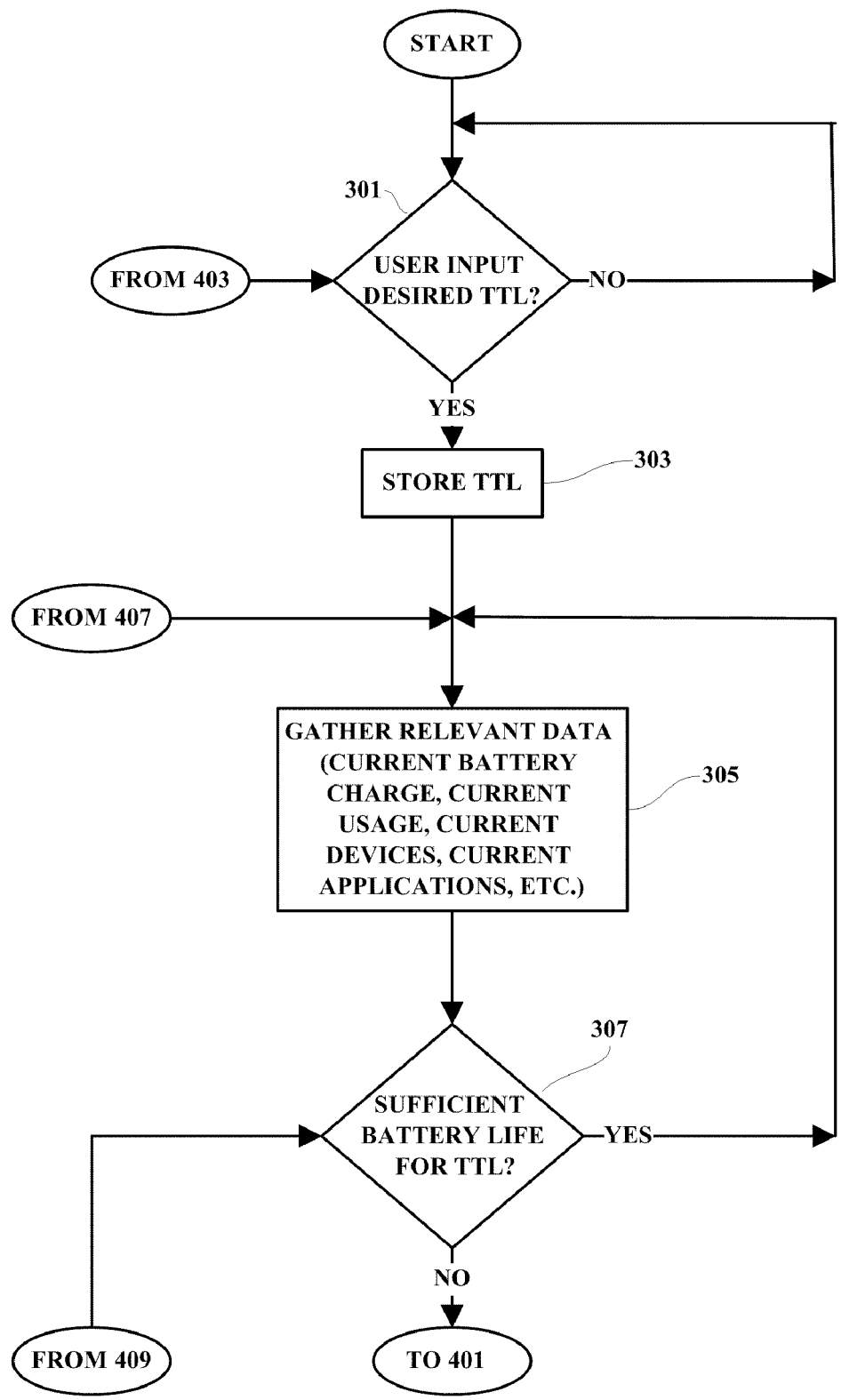
FIG. 3 is a flow chart illustrating an exemplary sequence of operations in one embodiment of the present invention.

In FIG. 3, there is shown a flow chart illustrating an exemplary sequence of operations in one embodiment of the present invention. As illustrated, a user is prompted to enter a time to live (TTL) input 301, i.e. a time duration or target time which the user desires that the user's wireless battery-operated device will continue to function before running out of power. Next, the TTL input is stored and/or saved 303 and relevant information is gathered 305 from applications, devices and batteries being used in the system, including current battery charge, current usage, current devices, current applications, etc. The input TTL is then compared with the calculated value of projected battery usage, i.e. processing occurs 307 to determine if there is sufficient battery life for the user's desired TTL using the current gathered system/device usage information. If there is sufficient battery life to meet the desired TTL, the system may provide a visual or audio confirmation to the user (not shown) as the system continues to dynamically monitor and gather usage information 305. When the system determines by the gathered information that there is no longer sufficient battery life 307 to meet the user's TTL (because of any changing reason including, inter alia, increased or new usage of applications requiring higher power usage), the processing continues as shown in FIG. 4.

Figure 4:
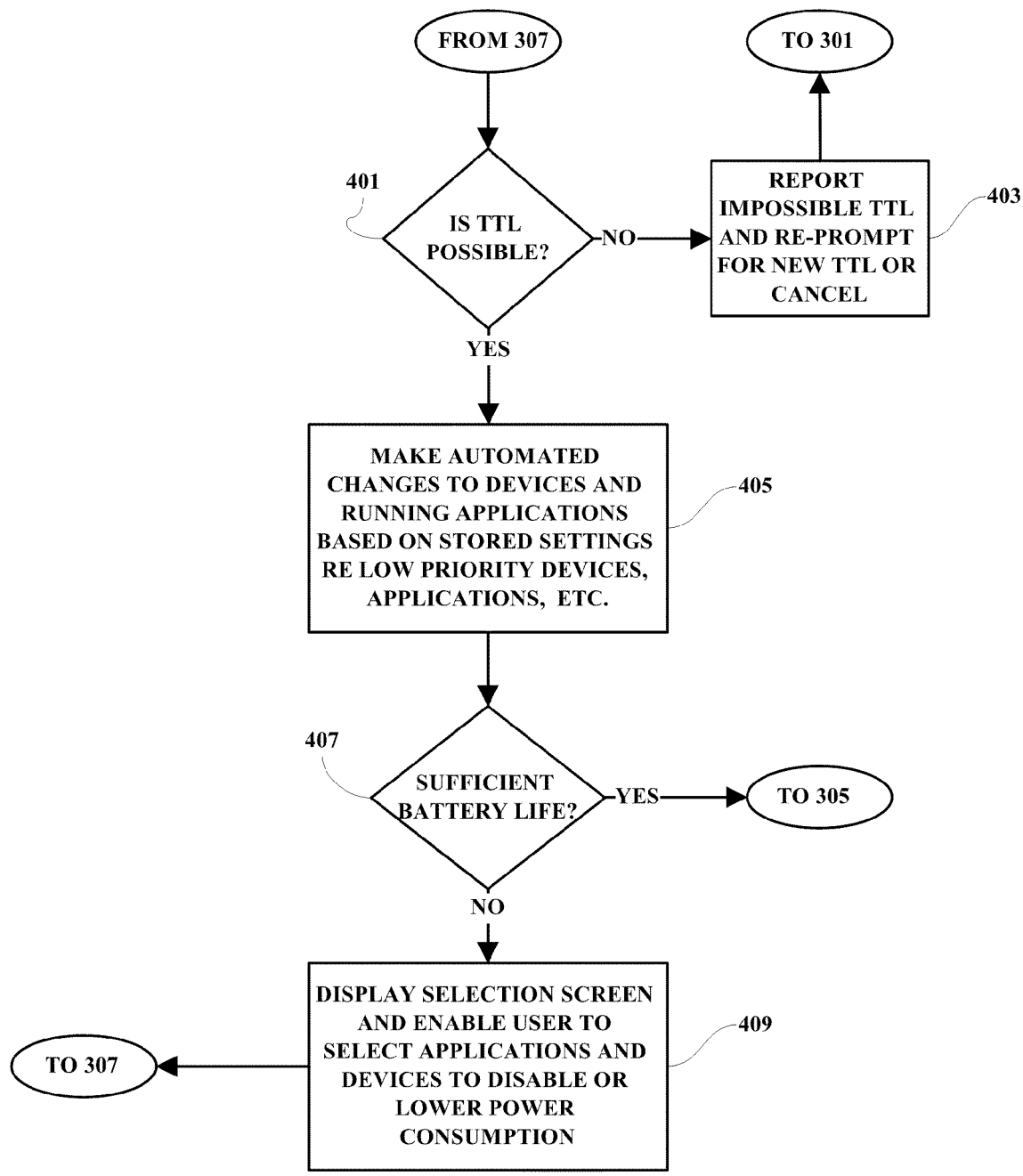
FIG. 4 is a continuation of the exemplary flow chart illustrated in FIG. 3.

In FIG. 4, the exemplary operation continues and if it determined that there is not sufficient battery life to meet the user's TTL 307, a determination is then made as to whether or not it is even possible, given the user's current usage, to meet the user's TTL 401. If it is determined that, given the user's current usage, the system is incapable of meeting the user's TTL no matter what devices or applications are shut-down or closed, the system will report (by visual, audio or screen display) that the input TTL is impossible to achieve and the user will be re-prompted to input a less aggressive TTL or cancel the TTL function.

If, however, it is possible to achieve the user's TTL if certain applications or devices are closed 401, then, using known methods and pre-defined power settings (stored in data store 207), make adjustments to system that fall with in those parameters (e.g. dim display, automatically disable devices user has agreed to (e.g. Bluetooth), etc. The automated changes or adjustments are made 405 to implement the user's input phased shut-down plan to first shut-down what the user has designated as low priority devices and/or applications. The user's initial set-up of the user's phased shut-down plan is critical at this point since a low priority device/application to one user in one situation may be a high priority device/application to another user in a second situation. The function of implementing the user's input regarding prioritization of applications and devices being used by the user, insures that what the user considers as critical applications/devices are not shut-down first as the system attempts to achieve the user's TTL.

After a first iteration of changes are made 405 by the system in order to lesson the power requirements of applications and devices of current usage, another check is made to determine if the first iteration of changes was sufficient to enable the system to achieve the user's input TTL 407. If the automatic changes are sufficient to enable the system to achieve the desired TTL 407, the process returns to block 305 (FIG. 3) to continue to monitor and gather relevant battery-related information as previously discussed. If, however, there is not sufficient battery life given current system usage to meet the user's TTL 407 then a selection screen (not shown) is displayed 409 to enable the user to select applications and devices to disable or lower power consumption in order to meet TTL. The user gets prompted to select which devices/applications can be printed, disabled, closed, suspended, or put into a reduced power consumption mode. This can be a graphical interface (not shown) that prompts with choices and may be ordered by least recently used, most power consuming, etc. Once some number of choices have been selected, the test 307 is repeated. The user interface may go away or stay up for more input. After the user inputs which running devices and/or applications can be powered-down 409, the system again makes a determination as to whether the user-specified power-down selections are sufficient to meet the user's TTL 307 (FIG. 3) and the processing continues from block 307.

It is noted that different devices have different power needs at different points in time. The utilization of the devices can be monitored and depending on the power consumption of the device, available power can be lowered or increased. For example if the wireless network is not utilized a lot there is no need to have the antenna working on highest power. The power supplied to the antenna can be lowered depending on the network utilization. This is another example of how the present system can help save power and use it when needed to meet the TTL.

In other examples, a user is enabled by the system to define properties in the power management tool to automatically change the Wi-Fi antenna from Max performance to Normal performance (thus using less power) when ever the battery goes below 60% capacity. Similarly the user defines that the Wi-Fi antenna should be powered off after 10%. The Screen brightness decrements a notch every 20% points in battery capacity and the CD spin rate changes from max performance to normal at 50% battery capacity.

In another example, if a user is boarding a plane and will be in the air for 5 hours, the user is enabled by the present system to open the power management application and input that 5 hours of battery life are needed. The power management application then begins to adjust all the application and device options to met that target of 5 hours. In an exemplary embodiment (not shown) a dialog screen is popped-up that shows which devices need to be turned off in order to meet that objective and enables the user to use the system to re-order the list so that those devices/applications above a displayed line are powered on and those below are powered off. Wi-Fi and CDMA radios might both be in the list. The user is enabled to "drag" the Wi-Fi antenna "below the line" on a screen display and then free up some energy to expend on a brighter screen, etc. The power manager continuously monitors and adjusts power profiles, periodically prompting the user of devices that have to be shut off or applications that need to be shut down in order to meet the target battery life.

In another example, a user defines that Application 1 shouldn't consume more than 10% of the total battery capacity and that Application 2 should consume only 20%. If Application 1 is an anti-virus application and tries to initiate a scan, it will immediately spike in the application profile for battery consumption and the power manager will pause or close that application after it consumes 10%. If the application has an API, then the power manager can request that it not perform the power intensive operation in favor of continuing to run. Application 2 might be desktop networked application and indexing functions might be disabled so as to conserve energy for expensive disk operations.

In another example, a user who has a "smartphone" device that is used for voice calls and to receive email and instant messaging, is enabled to define a rule that provides that the device must remain on to send and receive emails until 6 pm every day. If the user is using instant messaging and using the device for lots of voice calls during the day, the device can disable those functions so the battery has enough power to meet the primary objective of keeping the device on until 6 pm to send and receive emails.

Thus, there has been provided a method, programmed medium and system which enable user-controlled management of power requirements for mobile devices.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including any portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing power management in a mobile device designed to be powered by a battery, said method comprising:
providing user input means for receiving user input specifying an operating time desired by said user for said mobile device to maintain sufficient battery life for a continued operation of said mobile device during said operating time;
monitoring battery charge level of said battery;
determining battery charge usage level of said mobile device;
determining projected operating time of said mobile device if said mobile device continues to operate at said battery charge usage level;
determining if said battery charge level is sufficient to maintain operation of said mobile device during said operating time if said mobile device continues to operate at said battery charge usage level;
continuously determining a current battery charge usage level and a current battery charge level, said method further including continuously determining if said current battery charge level is sufficient to maintain operation of said mobile device during said operating time if said mobile device continues to operate at said current battery charge usage level;

notifying said user when it is determined that it is impossible to maintain operation of said mobile device during said operating time if said mobile device continues to operate at said current battery charge usage level;

determining which applications are running on said mobile device;

displaying a priority power-down schedule to said user for enabling said user to input a priority level to each application running on said mobile device; and using said power-down schedule by said mobile device to power-down one or more of said applications when it is determined that it is impossible to maintain operation of said mobile device during said operating time if said mobile device continues to operate at said current battery charge usage level, said mobile device being operable to continue to power-down said applications until said mobile device is determined to be able to operate for said operating time.

2. The method as set forth in claim 1 wherein said notifying is accomplished by providing a visual notification to said user.

3. The method as set forth in claim 1 wherein said notifying is accomplished by providing an audio notification to said user.

4. The method as set forth in claim 1 and further including notifying said user when it is determined that it is not possible to operate said mobile device for said operating time even if all applications are powered-down.

5. A method for processing power management in a mobile device designed to be powered by a battery, said method comprising:

providing user input means for receiving user input specifying an operating time desired by said user for said mobile device to maintain sufficient battery life for a continued operation of said mobile device during said operating time;

monitoring battery charge level of said battery;

determining battery charge usage level of said mobile device;

determining projected operating time of said mobile device if said mobile device continues to operate at said battery charge usage level;

determining if said battery charge level is sufficient to maintain operation of said mobile device during said operating time if said mobile device continues to operate at said battery charge usage level;

continuously determining a current battery charge usage level and a current battery charge level, said method further including continuously determining if said current battery charge level is sufficient to maintain operation of said mobile device during said operating time if said mobile device continues to operate at said current battery charge usage level;

notifying said user when it is determined that it is impossible to maintain operation of said mobile device during said operating time if said mobile device continues to operate at said current battery charge usage level;

determining which devices are running on said mobile device;

displaying a priority power-down schedule to said user for enabling said user to input a priority level to each device running on said mobile device; and using said power-down schedule by said mobile device to power-down one or more of said devices when it is determined that it is impossible to maintain operation of said mobile device during said operating time if said mobile device continues to operate at said current battery charge usage level, said mobile device being operable to continue to power-down said devices until said mobile device is determined to be able to operate for said operating time.

6. The method as set forth in claim 5 and further including notifying said user when it is determined that it is not possible to operate said mobile device for said operating time even if all devices are powered-down.

7. A method for processing power management in a mobile device designed to be powered by a battery, said method comprising:

providing user input means for receiving user input specifying an operating time desired by said user for said mobile device to maintain sufficient battery life for a continued operation of said mobile device during said operating time;

monitoring battery charge level of said battery;

determining battery charge usage level of said mobile device;

determining projected operating time of said mobile device if said mobile device continues to operate at said battery charge usage level;

determining if said battery charge level is sufficient to maintain operation of said mobile device during said operating time if said mobile, device continues to operate at said battery charge usage level;

continuously determining a current battery charge usage level and a current battery charge level, said method further including continuously determining if said current battery charge level is sufficient to maintain operation of said mobile device during said operating time if said mobile device continues to operate at said current battery charge usage level;

notifying said user when it is determined that it is impossible to maintain operation of said mobile device during said operating time if said mobile device continues to operate at said current battery charge usage level;

determining which devices and applications are running on said mobile device;

displaying a priority power-down schedule to said user for enabling said user to input a priority level to each device and application running on said mobile device; and using said power-down schedule by said mobile device to power-down one or more of said devices and applications when it is determined that it is impossible to maintain operation of said mobile device during said operating time if said mobile device continues to operate at said current battery charge usage level, said mobile device being operable to continue to power-down said devices and applications until said mobile device is determined to be able to operate for said operating time.

8. The method as set forth in claim 7 and further including notifying said user when it is determined that it is not possible to operate said mobile device for said operating time even if all devices and applications are powered-down.

9. A computer program product, said computer program product comprising one or more computer-readable, tangible storage devices and computer-readable program code which is stored on said one or more storage devices and when executed by one or more processors, enable processing of power management in a mobile device designed to be powered by a battery, the program code being configured such that when such program code is received by said mobile device, said mobile device is operable for:

receiving user input for specifying an operating time desired by said user for said mobile device to maintain sufficient battery life for a continued operation of said mobile device during said operating time;
monitoring battery charge level of said battery;
determining battery charge usage level of said mobile device;
determining projected operating time of said mobile device if said mobile device continues to operate at said battery charge usage level;
determining if said battery charge level is sufficient to maintain operation of said mobile device during said operating time if said mobile device continues to operate at said battery charge usage level;
continuously determining a current battery charge usage level and a current battery charge level, said method further including continuously determining if said current battery charge level is sufficient to maintain operation of said mobile device during said operating time if said mobile device continues to operate at said current battery charge usage level;
notifying said user when it is determined that it is impossible to maintain operation of said mobile device during said operating time if said mobile device continues to operate at said current battery charge usage level;
determining which applications are running on said mobile device;
displaying a priority power-down schedule to said user for enabling said user to input a priority level to each application running on said mobile device; and
using said power-down schedule by said mobile device to power-down one or more of said applications when it is determined that it is impossible to maintain operation of said mobile device during said operating time if said mobile device continues to operate at said current battery charge usage level, said mobile device being operable to continue to power-down said applications until said mobile device is determined to be able to operate for said operating time.

10. The computer program product as set forth in claim 9 wherein said mobile device is further operable in response to a reading of said program code for notifying said user by providing a visual notification to said user.

11. The computer program product as set forth in claim 9 wherein said mobile device is further operable in response to a reading of said program code for notifying said user by providing an audible notification to said user.

12. The computer program product as set forth in claim 9 wherein said mobile device is further operable in response to a reading of said program code for notifying said user when it is determined that it is not possible to operate said mobile device for said operating time even if all applications are powered-down.

13. A computer program product, said computer program product comprising one or more computer-readable, tangible storage devices and computer-readable program code which is stored on said one or more storage devices and, when executed by one or more processors, enable processing of power management, in a mobile device designed to be powered by a battery, the program code being configured such that when such program code is received by said mobile device, said mobile device is operable for:
receiving user input for specifying an operating time desired by said user for said mobile device to maintain sufficient battery life for a continued operation of said mobile device during said operating time;
monitoring battery charge level of said battery;
determining battery charge usage level of said mobile device;
determining projected operating time of said mobile device if said mobile device continues to operate at said battery charge usage level; and
determining if said battery charge level is sufficient to maintain operation of said mobile device during said operating time if said mobile device continues to operate at said battery charge usage level;
continuously determining a current battery charge usage level and a current battery charge level, said method further including continuously determining if said current battery charge level is sufficient to maintain operation of said mobile device during said operating time if said mobile device continues to operate at said current battery charge usage level;
notifying said user when it is determined that it is impossible to maintain operation of said mobile device during said operating time if said mobile device continues to operate at said current battery charge usage level;
determining which devices are running on said mobile device;
displaying a priority power-down schedule to said user for enabling said user to input a priority level to each device running on said mobile device; and
using said power-down schedule by said mobile device to power-down one or more of said devices when it is determined that it is impossible to maintain operation of said mobile device during said operating time if said mobile device continues to operate at said current battery charge usage level, said mobile device being operable to continue to power-down said devices until said mobile device is determined to be able to operate for said operating time.

14. The computer program product as set forth in claim 13 wherein said mobile device is further operable in response to a reading of said program code for notifying said user when it is determined that it is not possible to operate said mobile device for said operating time even if all devices are powered-down.

15. A computer program product, said computer program product comprising one or more computer-readable, tangible storage devices and computer-readable program code which is stored on said one or more storage devices and, when executed by one or more processors, enable processing of power management in a mobile device designed to be powered by a battery, the program code being configured such that when such program code is received by said mobile device, said mobile device is operable for:
receiving user input for specifying an operating time desired by said user for said mobile device to maintain sufficient battery life for a continued operation of said mobile device during said operating time;
monitoring battery charge level of said battery;
determining battery charge usage level of said mobile device;
determining projected operating time of said mobile device if said mobile device continues to operate at said battery charge usage level;
determining if said battery charge level is sufficient to maintain operation of said mobile device during said operating time if said mobile device continues to operate at said battery charge usage level;
continuously determining a current battery charge usage level and a current battery charge level, said method further including continuously determining if said current battery charge level is sufficient to maintain operation of said mobile device during said operating time if said mobile device continues to operate at said current battery charge usage level;

notifying said user when it is determined that it is impossible to maintain operation of said mobile device during said operating time if said mobile device continues to operate at said current battery charge usage level;

determining which devices and applications are running on said mobile device;

displaying a priority power-down schedule to said user for enabling said user to input a priority level to each device and application running on said mobile device; and using said power-down schedule by said mobile device to power-down one or more of said devices and applications when it is determined that it is impossible to maintain operation of said mobile device during said operating time if said mobile device continues to operate at said current battery charge usage level, said mobile device being operable to continue to power-down said devices and applications until said mobile device is determined to be able to operate for said operating time.

16. The computer program product as set forth in claim 15 wherein said mobile device is further operable in response to a reading of said program code for notifying said user when it is determined that it is not possible to operate said mobile device for said operating time even if all devices and applications are powered-down.

17. A mobile device enabled for processing power management in said mobile device, said mobile device being designed to be powered by a battery, said mobile device comprising:

means for receiving user input specifying an operating time desired by said user for said mobile device to maintain sufficient battery life for a continued operation of said mobile device during said operating time;

means for continuously determining a current battery charge usage level and a current battery charge level;

means for determining projected operating time of said mobile device if said mobile device continues to operate at said battery charge usage level;

means for determining if said battery charge level is sufficient to maintain operation of said mobile device during said operating time if said mobile device continues to operate at said battery charge usage level;

means for notifying said user when it is determined that it is impossible to maintain operation of said mobile device during said operating time if said mobile device continues to operate at said current battery charge usage level;

means for determining which applications are running on said mobile device;

means for displaying a priority power-down schedule to said user for enabling said user to input a priority level to each application running on said mobile device; and means for using said power-down schedule by said mobile device to power-down one or more of said applications when it is determined that it is impossible to maintain operation of said mobile device during said operating time if said mobile device continues to operate at said current battery charge usage level, said mobile device being operable to continue to power-down said applications until said mobile device is determined to be able to operate for said operating time.

18. The mobile device as set forth in claim 17 and further including:

means for notifying said user when it is determined that it is not possible to operate said mobile device for said operating time even if all applications are powered-down.

19. A mobile device enabled for processing power management in said mobile device, said mobile device being designed to be powered by a battery, said mobile'device comprising:

means for receiving user input specifying an operating time desired by said user for said mobile device to maintain sufficient battery life for a continued operation of said mobile device during said operating time;

means for monitoring battery charge level of said battery;

means for determining battery charge usage level of said mobile device;

means for determining projected operating time of said mobile device if said mobile device continues to operate at said battery charge usage level;

means for determining if said battery charge level is sufficient to maintain operation of said mobile device during said operating time if said mobile device continues to operate at said battery charge usage level;

means for continuously determining a current battery charge usage level and a current battery charge level, said mobile device being further operable for continuously determining if said current battery charge level is sufficient to maintain operation of said mobile device during said operating time if said mobile device continues to operate at said current battery charge usage level, and means for notifying said user when it is determined that it is impossible to maintain operation of said mobile device during said operating time if said mobile device continues to operate at said current battery charge usage level, wherein said notifying is accomplished by providing a visual or audio notification to said user;

means for determining which devices and applications are running on said mobile device;

means for displaying a priority power-down schedule to said user for enabling said user to input a priority level to each device and application running on said mobile device;

means for using said power-down schedule by said mobile device to power-down one or more of said devices and applications when it is determined that it is impossible to maintain operation of said mobile device during said operating time if said mobile device continues to operate at said current battery charge usage level, said mobile device being operable to continue to power-down said devices and applications until said mobile device is determined to be able to operate for said operating time; and means for notifying said user when it is determined that it is not possible to operate said mobile device for said operating time even if all devices and applications are powered-down.

* * * * *